H. E. VAN NESS.
LOCKING HUB FOR BICYCLES.
APPLICATION FILED JAN. 13, 1916.

1,189,315.

Patented July 4, 1916.

Witnesses

Inventor
Henry E. Van Ness
by Foster, Freeman, Watson & Coit
Attorneys

UNITED STATES PATENT OFFICE.

HENRY E. VAN NESS, OF ELMIRA, NEW YORK.

LOCKING-HUB FOR BICYCLES.

1,189,315. Specification of Letters Patent. Patented July 4, 1916.

Application filed January 13, 1916. Serial No. 71,925.

*To all whom it may concern:*

Be it known that I, HENRY E. VAN NESS, a citizen of the United States, and resident of Elmira, county of Chemung, State of New York, have invented certain new and useful Improvements in Locking-Hubs for Bicycles, of which the following is a specification.

This invention relates to hub constructions and particularly to bicycle hubs and has for its object the provision of a simple and reliable means for locking the hub to the axle on which it is mounted.

Other objects and the features of novelty will be apparent from the following description taken in connection with the accompanying drawings in which:—

Figure 1:
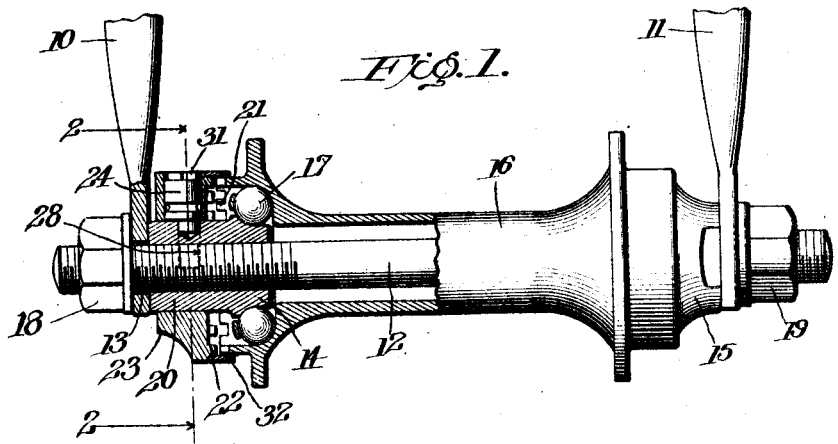
Figure 2:
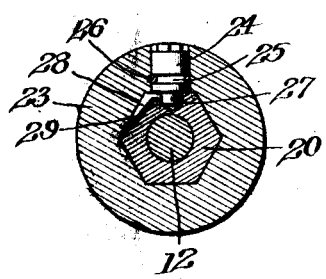
Figure 4:
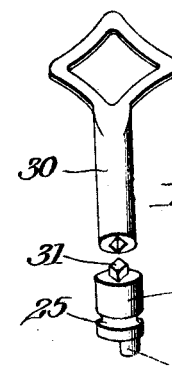
Figure 3:
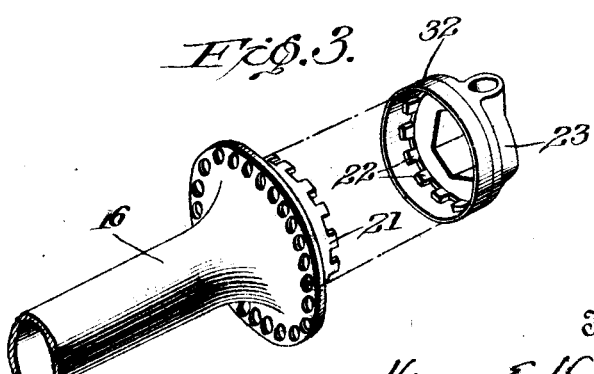

Figure 1 is a side elevation of a hub embodying the invention, certain parts being shown in section; Fig. 2 is a transverse section on the line 2—2 of Fig. 1; Fig. 3 is a perspective view of one end of the hub and the locking member which coöperates therewith; and Fig. 4 is a detail perspective view of some of the parts.

Referring to the drawings, 10 and 11 indicate the front forks or any other parts in which the hub is mounted. An axle 12 extends through eyes 13 in the parts 10 and 11 and has adjustably secured thereon bearing cones 14 and 15 on which the hub 16 is supported through ball bearings, one of which is indicated at 17. The axle is secured in the parts 10 and 11 and the bearing cones 14 and 15 are secured in any position to which they are adjusted, by means of nuts 18 and 19 on the outer ends of the axle. The cone 14 is preferably provided with an extension 20 of angular cross section and, as shown in Fig. 2 this extension is illustrated as hexagonal. One end of the hub 16 has teeth 21 projecting therefrom and adapted to interlock with teeth 22 on the member 23 which is slidably arranged on the extension 20, fitting the latter so as to be non-rotatable relatively thereto. A rotatable part 24 is arranged in a suitable cavity in the member 23 and has a circumferential groove 25 through which a pin 26, carried by the member 23 projects so as to rotatably hold the part 24 in the member 23, as clearly shown in Fig. 2. The part 24 is also provided with an eccentrically arranged extension 27 which projects into a transverse groove 28 in the extension 20 so that by rotating the part 24 the member 23 may be moved to and fro on the extension 20 to effect the engagement and disengagement of the teeth 21 and 22. A spring 29 is secured in the groove 28 and has its free end in engagement with the extension 27 for the purpose of holding the part 24 in the different positions to which it may be turned. The axis to the part 24 is transverse of the axle 12 so that this part may be conveniently turned by means of a key 30 which coöperates with the angular lug 31 on the outer end of the part. The lug 31 is preferably arranged substantially below the outer surface of the member 23 so that the part may not be actuated by an ordinary wrench or device other than the key 30. A flange 32 projects inwardly from the member 23 and conceals the teeth 21 and 22 and also excludes dust from the ball bearing 17. When the parts are in the position shown in Fig. 1, the hub 16 may be freely rotated. By using the key 30 the part 24 may be rotated to shift the member 23 so as to interlock the teeth 21 and 22 and thereby secure the hub 16 against rotation. When the device is applied to the front wheel of a bicycle it is intended that the rider shall carry the key 30 and when he leaves the bicycle turn the part 24 so as to lock the hub 16. It will then be impossible to ride the bicycle and therefore the locking of the hub will serve as a means to prevent the bicycle from being stolen since anyone attempting to carry off the bicycle with the front wheel locked so that it would have to be maintained off the ground, would excite suspicion. The spring 29 serves to hold the part 24 in the different positions to which it is adjusted and thus prevents the accidental engagement of the teeth 21 and 22 when the bicycle is being ridden.

It will be understood by those skilled in the art that changes may be made in the details of the construction illustrated without departing from the spirit of the invention, as defined in the appended claims and therefore I do not wish to be limited to the exact details shown and described.

Having thus described the invention what is claimed and desired to be secured by Letters Patent is:

1. In a device of the class described, the combination of a non-rotatable axle, a hub rotatably mounted thereon, a member movable longitudinally of the axle to lock the hub thereto, and a rotatable part carried by said member and coöperating with said axle to move the member into and out of locking position.

2. In a device of the class described, the combination of a non-rotatable axle, a hub rotatably mounted thereon, a member movable longitudinally of the axle to lock the hub thereto, a rotatable part carried by said member and coöperating with said axle to move the member into and out of locking position, and a spring coöperating with said part to hold it in its different positions.

3. In a device of the class described, the combination of a non-rotatable axle, a hub rotatably mounted thereon and provided with teeth adapted to interlock with the teeth on the hub and means carried by said member and coöperating with said axle to cause the member to be moved into and out of engagement with the hub to lock and unlock the hub.

4. In a device of the class described, the combination of a non-rotatable axle, a hub rotatably mounted thereon and provided with teeth at one end thereof, a member slidably arranged on said axle but non-rotatable relatively thereto and provided with teeth adapted to interlock with the teeth on the hub and a rotatable part carried by said member and having an eccentric portion whereby the member is moved into and out of engagement with the hub when the said part is rotated.

5. In a device of the class described, the combination of a non-rotatable axle, a hub rotatably mounted thereon and provided with teeth at one end thereof, a member slidably arranged on said axle but non-rotatable relatively thereto and provided with teeth adapted to interlock with the teeth on the hub, a rotatable part carried by said member and having an eccentric portion whereby the member is moved into and out of engagement with the hub when the said part is rotated, and a spring coöperating with said part to hold said member in the locking and unlocking positions.

6. In a device of the class described, the combination of a non-rotatable axle, bearing cones on said axle, a hub rotatably mounted on said bearing cones and having teeth at one end, a member slidable on one of said cones but non-rotatable relatively thereto and having teeth adapted to interlock with the teeth of the hub, and a rotatable part carried by said member and coöperating with the said cone to effect the movement of the member into and out of locking position.

7. In a device of the class described, the combination of a non-rotatable axle, bearing cones on said axle, a hub rotatably mounted on said bearing cones and having teeth at one end, a member slidable on one of the said cones but non-rotatable relatively thereto and having teeth adapted to interlock with the teeth of the hub, a rotatable part carried by said member and coöperating with the said cone to effect the movement of the member into and out of locking position, and a spring on said cone coöperating with said part to hold the latter in its different positions.

8. In a device of the class described, the combination of an axle, bearing cones thereon one of which is provided with an outward angular extension, a member fitting said extension and slidable axially thereon and provided with teeth on its inner side, a hub rotatably mounted on said cones and provided with teeth at one end adapted to interlock with the teeth on said member and a key actuated rotatable part carried by said member and engaging said extension to cause the member to slide on said extension when the said part is rotated.

9. In a device of the class described, the combination of an axle, bearing cones arranged thereon, one of said cones being provided with an angular extension and a transverse slot, a member fitting said extension and slidable thereon and provided with teeth at its inner end, a hub rotatably mounted on said cones and provided with teeth adapted to interlock with the teeth on said member, and a rotatable part carried by said member and having an eccentric portion engaging said slot whereby said member may be moved on said extension by rotating the said part.

10. In a device of the class described, the combination of an axle, bearing cones arranged thereon, one of said cones being provided with an angular extension and a transverse slot, a member fitting said extension and slidable thereon and provided with teeth at its inner end, a hub rotatably mounted on said cones and provided with teeth adapted to interlock with the teeth on said member, a rotatable member provided with a circumferential groove and an eccentric portion adapted to engage said slot, and a pin in said member and engaging said groove to hold the said part in the member.

11. In a device of the class described, the combination of an axle, a hub rotatably mounted thereon and provided with teeth at one end, a member slidable on said axle but non-rotatable relatively thereto and provided with teeth adapted to interlock with the teeth of the hub and a rotatable part having its axis arranged transversely of the axle and coöperating with the latter to cause the member to move into and out of locking position by rotating said part.

12. In a device of the class described, the combination of an axle, a hub rotatably mounted thereon and provided with teeth at one end, a member slidable on said axle but non-rotatable relatively thereto and provided with teeth adapted to interlock with the teeth of the hub, a rotatable part having its axis arranged transversely of the axle and coöperating with the latter to cause the member to move into and out of locking position by rotating said part, and a spring coöperating with said part to hold it in its different positions.

In testimony whereof I affix my signature.

HENRY E. VAN NESS.